(12) United States Patent
Bueno

(10) Patent No.: US 9,205,387 B2
(45) Date of Patent: Dec. 8, 2015

(54) CARBONATION DEVICE AND METHOD OF USING SAME

(75) Inventor: Serge Joseph Bueno, Tel Aviv (IL)

(73) Assignee: SPARKLING DRINK SYSTEMS INNNOVATION INTERNATIONAL SAS (SDS-IC INTERNATIONAL), Trets (FR)

( * ) Notice: Subject to any disclaimer, the term of this patent is extended or adjusted under 35 U.S.C. 154(b) by 0 days.

(21) Appl. No.: 14/349,967

(22) PCT Filed: May 30, 2012

(86) PCT No.: PCT/EP2012/060095
§ 371 (c)(1),
(2), (4) Date: Apr. 4, 2014

(87) PCT Pub. No.: WO2013/050185
PCT Pub. Date: Apr. 11, 2013

(65) Prior Publication Data
US 2014/0272052 A1    Sep. 18, 2014

(30) Foreign Application Priority Data

Oct. 7, 2011    (IT) ................ MI2011A1831

(51) Int. Cl.
*B01F 3/04* (2006.01)
*A23L 2/54* (2006.01)
*A23L 2/56* (2006.01)

(52) U.S. Cl.
CPC ............ *B01F 3/04801* (2013.01); *A23L 2/54* (2013.01); *A23L 2/56* (2013.01)

(58) Field of Classification Search
CPC .......... B01F 3/04801; A23L 2/54; A23L 2/56
USPC ................ 426/477; 99/323.1, 323.2
See application file for complete search history.

(56) References Cited

U.S. PATENT DOCUMENTS

| | | | |
|---|---|---|---|
| 662,499 A | | 11/1900 | Reenstierna |
| 2,102,398 A | * | 12/1937 | Wetstein ............... 99/323.2 |
| 2,805,846 A | | 9/1957 | Leon |
| 4,316,409 A | * | 2/1982 | Adams et al. ............. 99/275 |
| 4,457,877 A | * | 7/1984 | Love et al. ............. 261/64.3 |
| 4,526,730 A | | 7/1985 | Cochran et al. |
| 4,867,209 A | * | 9/1989 | Santoiemmo ............. 141/19 |
| 5,022,565 A | * | 6/1991 | Sturman et al. ........... 222/396 |

(Continued)

FOREIGN PATENT DOCUMENTS

| | | |
|---|---|---|
| DE | 612192 C | 4/1935 |
| DE | 2211152 | * 9/1973 |

(Continued)

OTHER PUBLICATIONS

Machine Translation for EP 2279786 published Feb. 2011.*

(Continued)

*Primary Examiner* — Anthony Weier
(74) *Attorney, Agent, or Firm* — Koppel, Patrick, Heybl & Philpott

(57) ABSTRACT

A carbonation device, having a container of a liquid, a body and a cartridge which contains a substance to be dispensed in the liquid, the body being adapted to be applied to an opening of the container and comprising a duct which is adapted to connect the liquid to the cartridge of the substance to be dispensed.

8 Claims, 4 Drawing Sheets

(56) References Cited

U.S. PATENT DOCUMENTS

| | | | |
|---|---|---|---|
| 5,110,012 A * | 5/1992 | Scholle et al. | 222/83.5 |
| 8,070,023 B2 * | 12/2011 | Vitantonio et al. | 222/399 |
| 2008/0217362 A1 * | 9/2008 | Vitantonio et al. | 222/399 |
| 2008/0217363 A1 * | 9/2008 | Vitantonio et al. | 222/399 |
| 2009/0140006 A1 * | 6/2009 | Vitantonio et al. | 222/108 |
| 2009/0261129 A1 * | 10/2009 | Vitantonio et al. | 222/394 |
| 2009/0302038 A1 * | 12/2009 | Taggart et al. | 220/260 |
| 2012/0031932 A1 * | 2/2012 | Vitantonio et al. | 222/399 |

FOREIGN PATENT DOCUMENTS

| | | |
|---|---|---|
| EP | 0867219 A1 | 9/1998 |
| EP | 2279786 A2 | 2/2011 |

OTHER PUBLICATIONS

International Search Report (PCT/ISA/210) for PCT/EP2012/060095 dated Jul. 24, 2012.

U.S. Appl. No. 12/363,278, filed Apr. 16, 1918, Parker.

* cited by examiner

CARBONATION DEVICE AND METHOD OF USING SAME

The present invention relates to a carbonation device.

In the field of adding gas to water, particularly for domestic consumption, carbonation devices are known which are capable of dispensing gas (carbon dioxide) in water, in order to make it fizzy.

Conventional carbonation devices for domestic use are constituted by turrets which generally comprise an accommodation seat in which a bottle of water is inserted so that the neck of the bottle, and specifically the opening hole of the bottle, engages with an element of such devices for dispensing gas or other substance.

In the turret of such conventional devices an accommodation seat for the gas cartridges is also provided so that the gas that exits from such cartridges passes through the dispensing element in order to enter the bottle, following an activation of the device by the user.

Such conventional carbonation devices are not devoid of drawbacks, among which is the fact that they are cumbersome and not portable.

Another drawback of such conventional carbonation devices consists in that in them, it is not possible to adjust the level of fizziness desired.

A further drawback consists in that the volume of water to be carbonated in the bottles used in such conventional devices is not larger than one liter.

The aim of the present invention is to provide a carbonation device that solves the above mentioned technical problem, compensates for the drawbacks and overcomes the limitations of the known art by making it possible to considerably reduce the encumbrances thereof and thus ensuring the portability thereof.

Within this aim, an object of the present invention is to provide a carbonation device that makes it possible to select the level of fizziness of the liquid to be carbonated.

Another object of the invention consists in the ability to carbonate a volume of up to 2 liters of water, by ensuring an optimal distribution of the gas during the introduction.

Another object of the invention is to provide a carbonation device that can be applied directly to a container of liquid, such as a bottle.

Another object of the invention is to provide a carbonation device that is capable of offering the widest guarantees of reliability and safety in use.

Another object of the invention is to provide a carbonation device that is easy to implement and economically competitive when compared to the known art.

This aim and these and other objects which will become better apparent hereinafter are achieved by a carbonation device, comprising a container of a liquid, a body and a cartridge which contains a substance to be dispensed in said liquid, characterized in that said body is adapted to be applied to an opening of said container and in that said body comprises a duct which is adapted to connect said liquid to said cartridge of said substance to be dispensed.

Further characteristics and advantages of the invention will become better apparent from the description of two preferred, but not exclusive, embodiments of a carbonation device, which are illustrated by way of non-limiting example in the accompanying drawings, wherein.

Figure 1:
FIG. 1 is a perspective view of a first embodiment of a carbonation device, according to the invention, applied to a bottle.

With reference to the figures, the carbonation device, generally designated with the reference numeral 1, comprises a body 3 that is adapted to be applied to the opening of a container 2 of a liquid. The container 2 advantageously is bottle shaped with an opening at the top of the neck of the bottle. Advantageously the body 3 is applied to the container 2 so that the container 2 supports the body 3, without the support of further structures external to the container 2.

According to the invention, the body 3 is entirely hollow and defines a seat 7 for the accommodation of a cartridge 5 of a substance to be dispensed, such as carbon dioxide, or of fruit concentrate, or a combination of both or other additives for beverages. Such body 3 comprises a duct 4 which is adapted to connect the liquid contained in the container 2 with the cartridge 5 which contains the substance to be dispensed in the liquid.

The body 3 is adapted to be fixed in a bayonet-like manner to the container 2, thus ensuring the gas seal. Alternatively, the body 3 is adapted to be screwed onto the container 2, thus ensuring the gas seal. For a container 2 in the form of a bottle, the body 3 is applied at the opening at the top of the neck of the bottle.

Advantageously the container 2 in bottle form has a volume of up to 2 liters.

The carbonation device 1 comprises dispensing means 9 which are adapted to dispense the gas from the gas cartridge 5 to the liquid to be carbonated contained in the container 2, or alternatively to dispense the fruit concentrate, or a combination of gas and fruit concentrate, or other additives for beverages.

Figure 2:
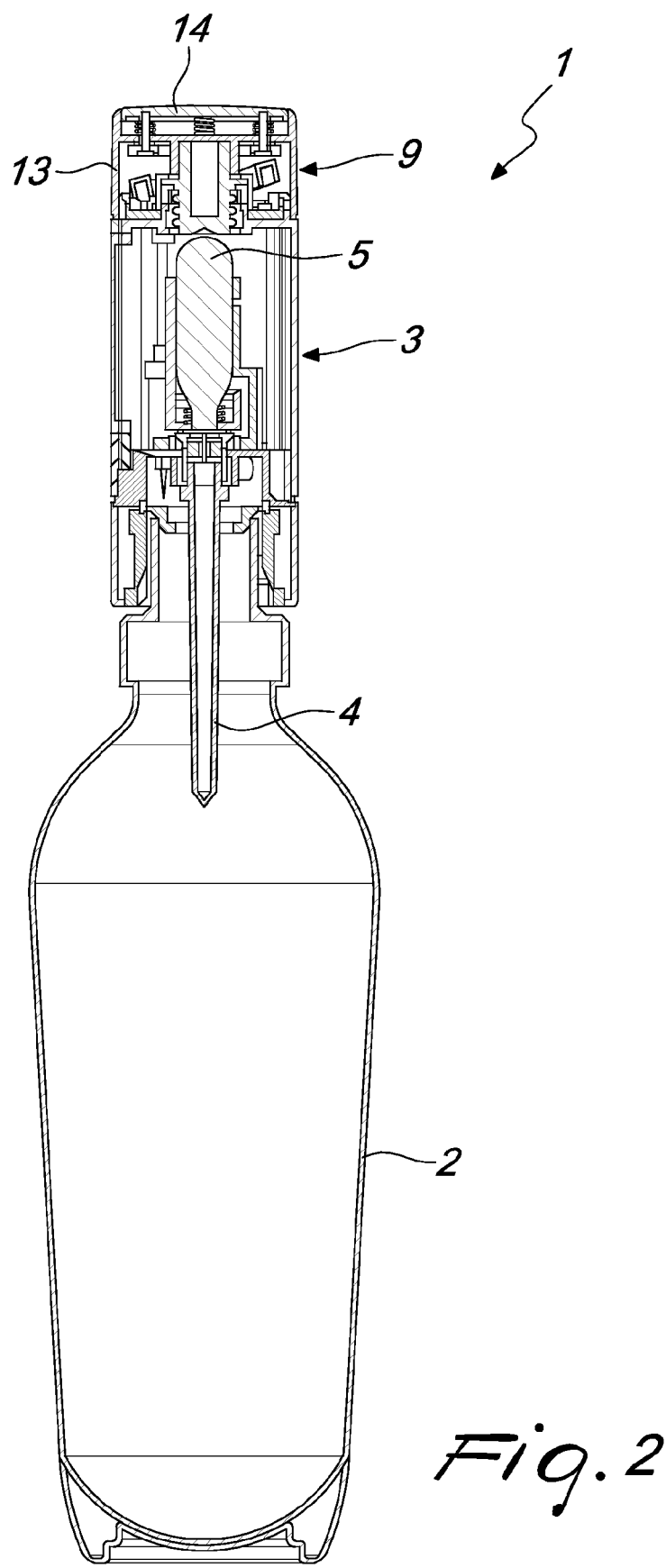
FIG. 2 is a sectional view of the device in FIG. 1.
Figure 3:
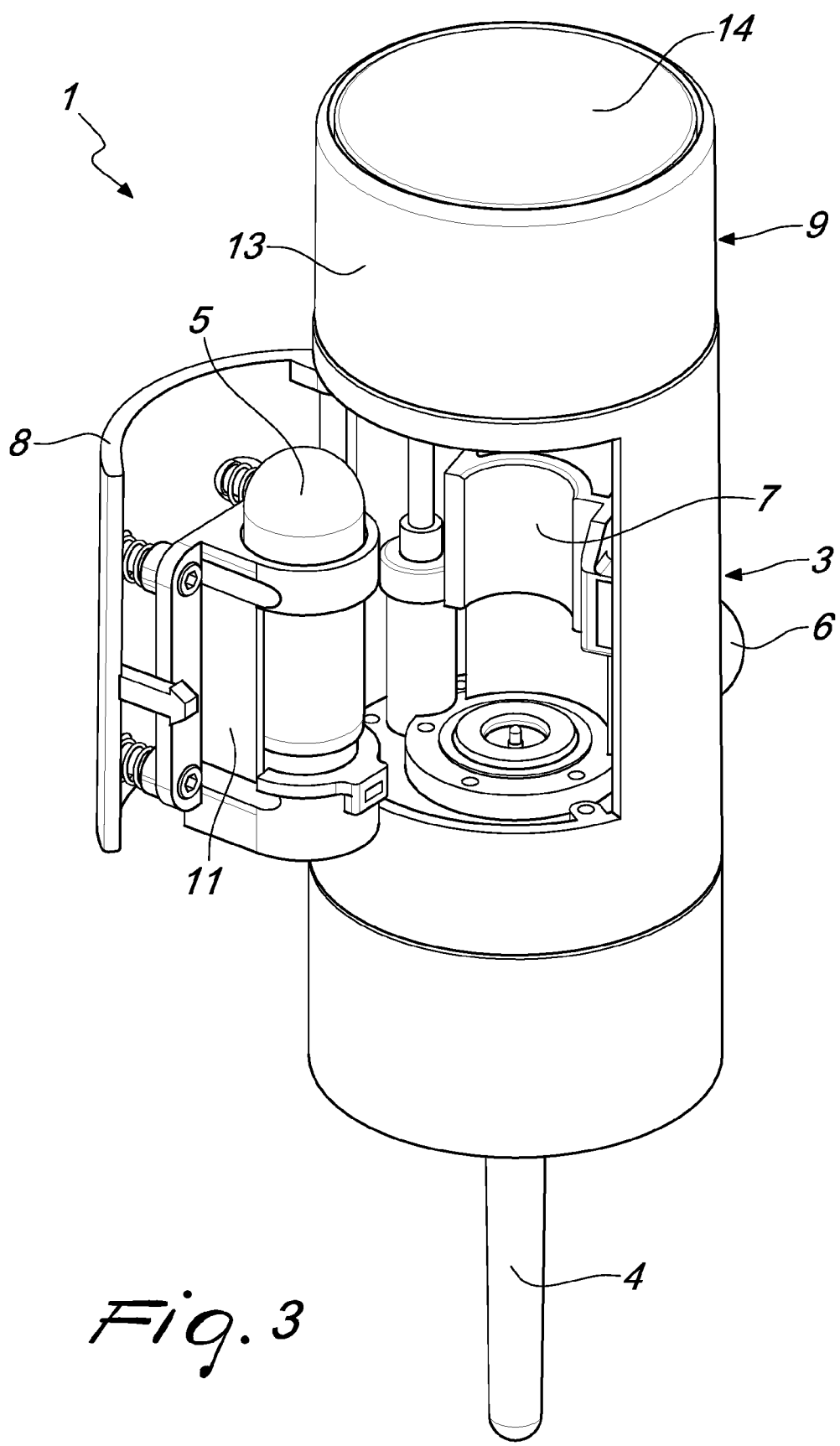
FIG. 3 is a perspective view of the carbonation device shown in FIG. 1, according to the invention.

With reference to the first embodiment, illustrated in FIGS. 1 to 3, the dispensing means 9 are advantageously provided at the top of the body 3, in the form of a rotatable element 13 and of a button 14. The rotatable element 13 is adapted to activate, by way of its anticlockwise rotation, the cartridge 5, which is substantially pressed and thus perforated as a consequence of such action, thus dispensing the gas contained in the cartridge 5 into the container 2. The button 14 is adapted to release, by way of a pressure thereof, the excess gas still present in the cartridge 5 in order to ensure that it is possible to unscrew and remove the body 3 of the carbonation device 1 from the container 2 in total safety.

Alternatively, in a further embodiment of the carbonation device, not shown in the accompanying figures, the rotatable element 13 also performs the function of a button for releasing the excess residual gas in the cartridge 5, since it is rotatable in both directions, clockwise and anticlockwise, where the rotation of such rotatable element 13 in one direction is adapted to activate the cartridge 5, which is perforated as a consequence of such action, thus dispensing the gas into the liquid to be carbonated, and the rotation in the opposite direction is adapted to release the residual gas contained in the cartridge 5.

The carbonation device 1 further comprises means 6 for controlling the dispensing of the gas that passes from the cartridge 5 to the liquid contained in the container 2 through the duct 4. Such dispensing control means 6 are advantageously of the type of an adjustment wheel. Such control means 6 are adapted to adjust the pressure for dispensing the gas which is released by the cartridge 5 in the liquid to be carbonated, making it possible to release different quantities of gas at different dispensing speeds, for carbonating the liquid to different levels of fizziness. Such control means 6 are therefore adapted to adjust the quantity and the size of the bubbles of gas introduced into the liquid to be carbonated.

The seat 7 for accommodating the gas cartridge 5 is accessible from outside the body 3.

In the first embodiment, the body 3 comprises a door 8 which can be opened, revealing an insertion cage 11 for the cartridge 5. When the door 8 is closed, the cartridge 5, held by the insertion cage 11, is inserted into the accommodation seat 7 inside the body 3. With the door 8 closed, the nozzle for dispensing the cartridge 5 is adapted to be connected with the duct 4, in order to allow the passage of gas from the cartridge 5 to the liquid following the activation of the dispensing means 9.

Advantageously, with the cartridge 5 inserted in the insertion cage 11 of the door 8, the carbonation device is provided with a safety device that does not allow opening and closing of the door 8 if the rotatable element 13 is in a position where it is exerting pressure on the cartridge 5, i.e. is completely or partially in a condition of activation of the cartridge 5. In order to be able to open or close the door 8, it is in fact necessary that the rotatable element 13 be rotated clockwise, i.e. unscrewed, until it reaches an initial working position.

The carbonation device 1 further comprises a safety relief valve.

The body 3 advantageously is provided with at least some outer surface portions made of non-slip material in order to ensure a firm grip.

Figure 4:
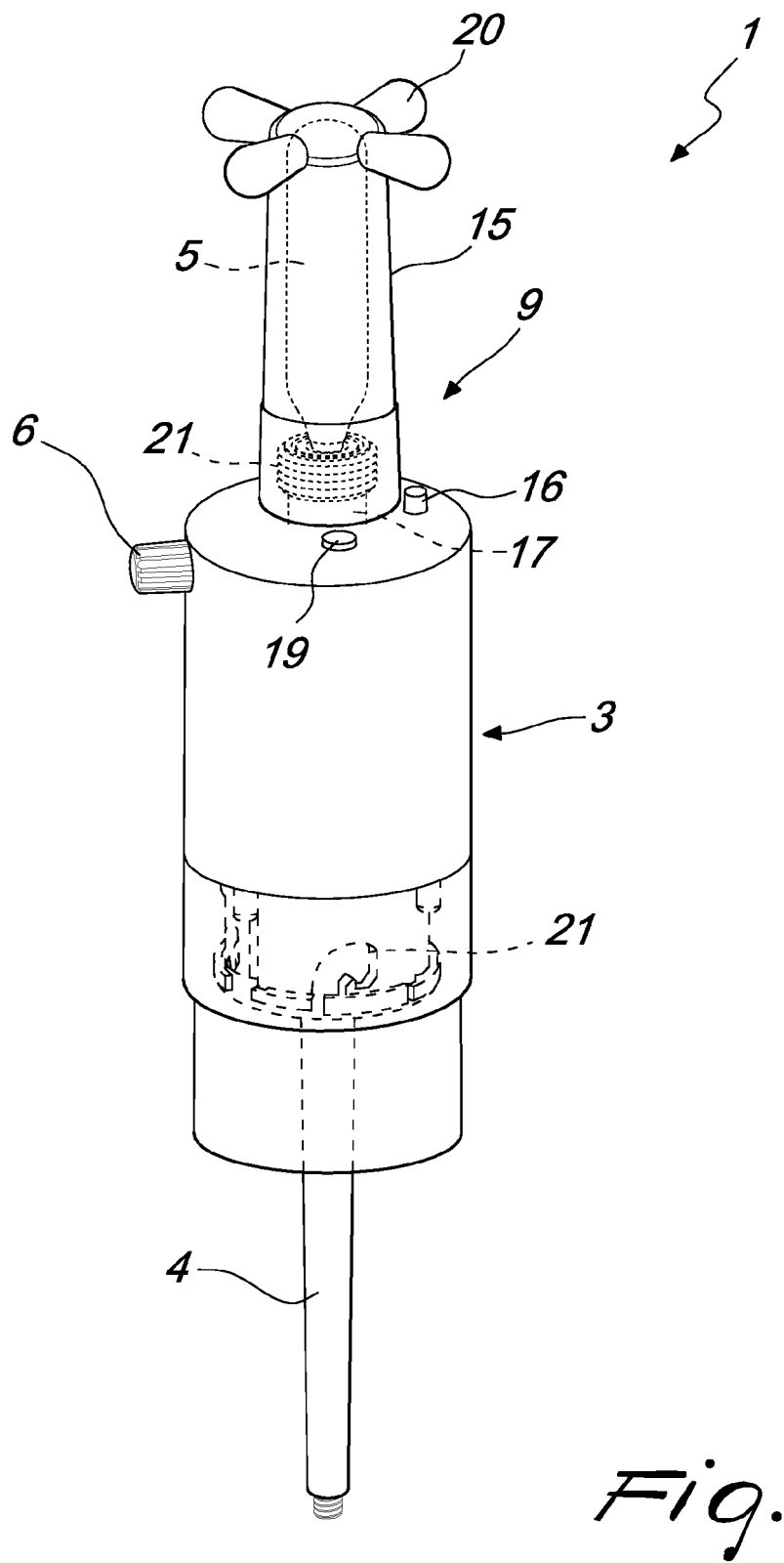
FIG. 4 is a perspective view of a carbonation device, according to the invention, in a second embodiment.

In the second embodiment, illustrated by way of example in FIG. 4, the body 3 comprises a central cylindrical body 17 that engages coaxially with the duct 4. The central cylindrical body 17 can be removed from the body 3 since it can be screwed onto the body 3.

Such central cylindrical body 17 advantageously comprises a threading 21 at its opposite end to the end that engages with the duct 4. Such threading 21 makes it possible for a rotatable cap 15, advantageously provided with an ergonomic grip 20, to be screwed on. Such rotatable cap 15 is adapted to contain the cartridge 5.

In the second embodiment the dispensing means 9 are constituted by the rotatable cap 15, which contains the cartridge 5, and by a button 16. The rotatable cap 15 and the button 16 of the carbonation device 1 in the second embodiment fulfil the same functions of the respective rotatable element 13 and button 14 of the first embodiment.

In the second embodiment, the central cylindrical body 17 is connected to the duct 4, and the set of elements, rotatable cap 15 and central cylindrical body 17, can be extracted for maintenance and cleaning. Such extraction can occur only when a further button 19 is kept pressed.

In the second embodiment too, the body 3 is adapted to be fixed in a bayonet-like manner to the container 2, thus ensuring the gas seal, by way of the bayonet-like coupling 21 which conveniently engages, for a container 2 in the form of a bottle, with the neck thereof.

In both of the embodiments illustrated, the body 3 advantageously is provided with at least some outer surface portions made of non-slip material in order to ensure a firm grip.

Operation of the carbonation device is described hereinafter.

The method for adding gas to a liquid that uses the carbonation device 1 comprises the steps described hereinafter.

The container 2 is filled to the limit indicated with the liquid to be carbonated or to which a flavor is to be added.

The gas cartridge 5 is accommodated in the body 3 at the accommodation seat 7. Such operation of accommodating the cartridge 5 in the body 3 occurs before the body 3 is stably applied to the container 2.

The operation of accommodating the cartridge occurs, in the first embodiment, by opening the door 8, placing the cartridge 5 in the insertion cage 11 in the door 8 which can be opened, and closing such door 8, so that the cartridge 5 conveniently is placed in the accommodation seat 7.

In the second embodiment, the step of inserting the cartridge 5 is performed by unscrewing the rotatable cap 15 from the central cylindrical body 17, inserting the cartridge 5 into a suitable seat of the rotatable cap 15 and re-screwing the rotatable cap 15 onto the central cylindrical body 17, and ensuring that the central cylindrical body 17 is fixed with a bayonet system to the body 3.

The body 3 is thus stably applied, by way of screwing or fixing in a bayonet-like manner, to the container 2, at the opening, i.e., if using a bottle as the container, at the opening at the top of the neck of the bottle.

Afterward it is possible to adjust the dispensing control means 6, for example by rotating the corresponding wheel, in order to adjust the level of fizziness desired.

By way of rotation of the rotatable element 13 or of the rotatable cap 15 of the dispensing means 9 the cartridge 5 is activated. In particular, the rotation of the rotatable means 13 and 15 result in the cartridge first being pressed toward the opening of the container 2 and then perforated, at its more tapered end engaged with the opening of the container 2, thus giving rise to the dispensing of the gas into the liquid to be carbonated by way of the duct 4. Pressing the buttons 14 and 16 thus gives rise to the release of the residual gas which, passing from the cartridge 5 through the duct 4, reaches the liquid, thus ensuring that at the end of this operation the cartridge 5 does not contain any further residual gas.

The carbonation operation concludes with the removal of the body 3 from the container 2.

In the second embodiment, the body 3 can be conveniently washed by removing the central cylindrical body 17, by pressing the button 19.

The cartridge 5 is advantageously replaced with a new cartridge, when dispensing is complete, by opening the door 8 in the first embodiment or by unscrewing the rotatable cap 15 in the second embodiment.

In practice it has been found that the carbonation device, according to the present invention, fully achieves the intended aim and objects in that it offers reduced encumbrances, it is portable, it is directly applicable to a container such as a bottle, and it makes it possible to select the level of fizziness desired.

Another advantage of the carbonation device, according to the invention, consists in that it can carbonate volumes of water of up to 2 liters.

A further advantage of the carbonation device, according to the invention, consists in that it is safe and reliable.

The carbonation device, thus conceived, is susceptible of numerous modifications and variations, all of which are within the scope of the appended claims.

Moreover, all the details may be substituted by other, technically equivalent elements.

In practice the materials employed, provided they are compatible with the specific use, and the contingent dimensions and shapes, may be any according to requirements.

The disclosures in Italian Patent Application No. MI2011A001831 from which this application claims priority are incorporated herein by reference.

Where technical features mentioned in any claim are followed by reference signs, those reference signs have been included for the sole purpose of increasing the intelligibility of the claims and accordingly, such reference signs do not

The invention claimed is:

1. A dispensing device for dispensing a substance into a liquid contained in a container, said dispensing device comprising:
   a cartridge which contains the substance to be dispensed in said liquid,
   a body adapted to be applied to an opening of said container,
   said body being provided with a seat for removably accommodating said cartridge,
   said body comprising a main portion that is adapted to be applied to the opening of said container,
   said body comprising a duct which is adapted to connect said liquid to said cartridge of said substance to be dispensed,
   said body further comprising a rotatable element that is rotatably connected to said main portion of said body and that is adapted to activate said cartridge by perforating said cartridge upon rotation of said rotatable element with respect to said main portion,
   wherein said body is adapted to be fixed in a bayonet-like manner to said container.

2. The dispensing device according to claim 1, wherein said substance to be dispensed is carbon dioxide gas or fruit concentrate or a combination of both or other additives for beverages.

3. The dispensing device according to claim 1, further comprising means for controlling the dispensing in said liquid of said substance from said cartridge.

4. The dispensing device according to claim 1, wherein said main portion of said body comprises said seat which is adapted to accommodate said cartridge, said seat being accessible from the outside.

5. The dispensing device according to claim 1, further comprising safety buttons for releasing residual gas from said cartridge.

6. The dispensing device according to claim 4, wherein said main portion of said body comprises a door which can be opened for access to said seat for accommodating said cartridge.

7. A method for adding a substance to a liquid which uses a dispensing device according to claim 1, comprising the steps of:
   filling said container with said liquid;
   accommodating said cartridge in said body;
   stably applying said body to said container;
   dispensing said substance of said cartridge in said liquid by rotating said rotatable element; and
   removing said body from said container.

8. A dispensing device for dispensing a substance into a liquid contained in a container said dispensing device comprising:
   a cartridge which contains the substance to be dispensed in said liquid,
   a body adapted to be applied to an opening of said container,
   said body being provided with a seat for removably accommodating said cartridge,
   said body comprising a main portion that is adapted to be applied to the opening of said container,
   said body comprising a duct which is adapted to connect said liquid to said cartridge of said substance to be dispensed,
   said body further comprising a rotatable element that is rotatably connected to said main portion of said body and that is adapted to activate said cartridge by perforating said cartridge upon rotation of said rotatable element with respect to said main portion,
   wherein said main portion of said body comprises said seat which is adapted to accommodate said cartridge, said seat being accessible from the outside,
   wherein said main portion of said body comprises a door which can be opened for access to said seat for accommodating said cartridge.

* * * * *